US006914942B2

United States Patent
Tsai et al.

(10) Patent No.: US 6,914,942 B2
(45) Date of Patent: Jul. 5, 2005

(54) METHOD AND APPARATUS FOR SELECTING AN OPTIMAL SWAPPING TECHNIQUE IN DISCRETE MULTI-TONE SYSTEM

(75) Inventors: Shang-Ho Tsai, Hsinchu (TW); Hsien-Chun Huang, Hsinchu (TW); Ching-Kae Tzou, Hsinchu (TW)

(73) Assignee: Silicon Integrated Systems Corporation, Hsinchu (TW)

( * ) Notice: Subject to any disclaimer, the term of this patent is extended or adjusted under 35 U.S.C. 154(b) by 773 days.

(21) Appl. No.: 09/849,309

(22) Filed: May 7, 2001

(65) Prior Publication Data

US 2002/0163973 A1 Nov. 7, 2002

(51) Int. Cl.[7] ............................ H04K 1/10; H04L 27/28
(52) U.S. Cl. ........................................ 375/260; 375/295
(58) Field of Search .............................. 375/260, 360; 370/329, 341, 437

(56) References Cited

U.S. PATENT DOCUMENTS 5,265,151 A * 11/1993 Goldstein ................ 379/93.32
5,479,447 A    12/1995 Chow et al.
2001/0031014 A1 * 10/2001 Subramanian et al. ...... 375/260
2002/0048334 A1 *  4/2002 Hasegawa .................. 375/360
2002/0131440 A1 *  9/2002 Tonissen et al. ............ 370/437

* cited by examiner

*Primary Examiner*—Amanda T. Le
*Assistant Examiner*—Lawrence B. Williams
(74) *Attorney, Agent, or Firm*—Nixon Peabody LLP; Donald S. Studebaker

(57) ABSTRACT

A method and an apparatus are provided in this invention to select an optimal swapping technique in discrete multi-tone system. The algorithm for performing gain-swapping is also proposed in the present invention. A swapping technique is selected from gain-swapping and a combination of bit-swapping and gain-swapping based on two index values such that the difference between the maximum mean square error ($MSE_{max}$) and the minimum mean square error ($MSE_{min}$) is minimized and the gain factor constraints are met. The first index value I is representative of range of improvement when adopting the gain-swapping as the swapping technique, and the second index value J is representative of range of improvement when adopting a combination of the gain-swapping and the bit-swapping as the swapping technique.

14 Claims, 8 Drawing Sheets

| $b_i \to b_{i-1}$ | $G_{b_i} \to G_{b_{i-1}}$ (dB) |
|---|---|
| 2 -> 0 | 14.57 |
| 3 -> 2 | 2.31 |
| 4 -> 3 | 3.31 |
| 5 -> 4 | 3.15 |
| 6 -> 5 | 3.08 |
| 7 -> 6 | 3.04 |
| 8 -> 7 | 3.03 |
| 9 -> 8 | 3.02 |
| 10 -> 9 | 3.01 |
| 11 -> 10 | 3.01 |
| 12 -> 11 | 3.01 |
| 13 -> 12 | 3.01 |
| 14 -> 13 | 3.01 |
| 15 -> 14 | 3.01 |
Fig. 10
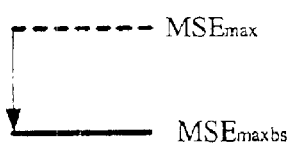
MSEmax
MSEmaxbs
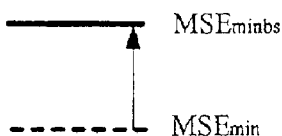
MSEavgbs = (MSEmaxbs + MSEminbs)/2
MSEminbs
MSEmin
Fig. 11

METHOD AND APPARATUS FOR SELECTING AN OPTIMAL SWAPPING TECHNIQUE IN DISCRETE MULTI-TONE SYSTEM

BACKGROUND OF THE INVENTION

1. Field of the Invention

The present invention relates to the selection of an optimal swapping technique for a Discrete Multitone (DMT) system.

2. Brief Description of the Prior Art

Today's telephone networks (twisted pair copper media) are not originally designed for high data rate transmission. In order to accommodate high data rate interactive services provided for small businesses and general households, high-speed communication paths must be available. Though the optic fiber is the ultimate choice, the optic fiber network is not yet well-constructed at this stage. To solve this problem, Asymmetric Digital Subscriber Line (ADSL) technology has been proposed to increase the effective bandwidth of the existing telephone networks for allowing high-speed internet connection.

DMT systems are implemented in ADSL communication system for dividing the available bandwidth provided by twisted pair copper media into multiple sub-channels (i.e. tones). It has been adopted in many industrial standards, such as the ANSI T1.413. In order to maintain optimal performance in a DMT system, it is generally desirable that the mean square errors (MSE) should be kept as close as possible among different sub-channels.

Prior art bit-swapping techniques are used to reduce the difference between the maximum mean square error ($MSE_{max}$) and the minimum mean square error ($MSE_{min}$) within all sub-channels. This technique adjusts the sub-channels corresponding to $MSE_{max}$ and $MSE_{min}$, while leaving the sub-channels with relatively moderate MSE unchanged. Details regarding the bit-swapping may be found in "Understanding Digital Subscribe Line Technology", *Prentice Hall PTR, Upper Saddle River, N.J.* 07458, by Thomas Starr, John M. Cioffi, and Peter Silverman, and U.S. Pat. No. 5,479,447, "Method And Apparatus for Adaptive, Variale Bandwidth, High-Speed Data Transmission of a Multicarrier Signal Over Digital Subscriber Lines" granted to Chow et al. The detailed manner for calculating MSE respecting each sub-channel is well-known and may be found in any related reference.

Bit-swapping reallocates bits of data from the sub-channel with $MSE_{max}$ to the sub-channel with $MSE_{min}$. In this way, the SNR (signal-to-noise ratio) of the sub-channel with $MSE_{max}$ increases due to fewer bits of data loaded under the same gain. On the other hand, the SNR of the sub-channels with $MSE_{min}$ decreases due to more bits of data loaded under the same gain. Since the increase of SNR implies the decrease of MSE, and vice versa, one reduces the difference between the $MSE_{max}$ and $MSE_{min}$ by reallocating amount of bits in each sub-channel. According to Chow's method, bit-swapping occurs when $MSE_{max} > MSE_{min} + MSE_{threshold}$, where $MSE_{threshold}$ is typically chosen to be 3 dB.

Considering the example as shown in FIG. 1, $MSE_{max}$ is 6.2 dB and $MSE_{min}$ is 3 dB, and the gain factors corresponding to the two sub-channels are $g_{max}=-1$ dB and $g_{min}=1.5$ dB respectively. The difference between $MSE_{max}$ and $MSE_{min}$ is 3.2 dB. Since the difference between $MSE_{max}$ and $MSE_{min}$ exceeds 3 dB, bit-swapping is employed and the process ends up with $MSE_{max}$ decreasing by 3 dB and $MSE_{min}$ increasing by 3 dB. The resultant error level diagram is shown in FIG. 2. The updated difference between $MSE_{max}$ and $MSE_{min}$ is 2.8 dB. There is an improvement of 0.4 dB over the previous condition.

Bit-swapping suffers greatly from numerous drawbacks. It is not efficient enough for eliminating the difference between $MSE_{max}$ and $MSE_{min}$. It is even useless in some specific situations. Considering the following example shown in FIG. 3, in which the difference between $MSE_{max}$ and $MSE_{min}$ is 3 dB. When bit-swapping technique is employed, $MSE_{max}$ decreases 3 dB while $MSE_{min}$ increases 3 dB. The resultant difference between $MSE_{max}$ and $MSE_{min}$ after bit-swapping remains 3 dB. Further bit-swapping will ultimately fail to reduce the difference between $MSE_{max}$ and $MSE_{min}$. In the example of FIG. 3, it shows that performing bit-swapping in such situation is a waste of system resource.

The concept of gain-swapping has been set forth as an alternative method to reduce or even eliminate the difference among all the sub-channels. The gain-swapping concept features that the MSEs in all sub-channels can be brought to the same level by adding gain or subtracting gain from each channel. However, so far there has been no document proposed to discuss gain-swapping algorithm. Most publications focus on bit-swapping, and no document has ever shown that gain-swapping can provide better performance than bit-swapping does in some cases.

SUMMARY OF THE INVENTION

It is the an objective of the invention to provide a method for selecting a swapping technique in a DMT system such that the difference between $MSE_{max}$ and $MSE_{min}$ can be effectively eliminated, thus achieving an optimal system performance.

It is another objective of the present invention to provide a swapping technique selector for selecting an optimal swapping technique from a group consisting of a bit-swapping and a gain-swapping techniques in a discrete multi-tone (DMT) system.

It is still another objective of the present invention to provide a method and a cooperating algorithm for performing gain-swapping.

The method for selecting a swapping technique selects the optimal swapping technique from a group consisting of a bit-swapping and a gain-swapping techniques in a discrete multi-tone (DMT) system having multiple sub-channels, gain factor constraints, a threshold index value (T), and a maximum mean square error ($MSE_{max}$) and a minimum mean square error ($MSE_{min}$). The method comprises the step of determining a first index value (I) and a second index value (J) based on $MSE_{max}$, $MSE_{min}$ and the gain factor constraints according to a predetermined manner, the step of determine whether larger one of I and J is larger than T, the step of determining whether I is equal to or larger than J, if the larger one of I and J is larger than T, and the step of selecting the gain-swapping as the swapping technique if I is equal to or larger than J, and selecting a combination of bit swapping and gain swapping as the swapping technique.

The swapping technique selector selects an optimal swapping technique from a group consisting of a bit-swapping and a gain-swapping techniques in a discrete multi-tone (DMT) system having multiple sub-channels, gain factor constraints, and a threshold index value (T) and a maximum mean square error ($MSE_{max}$) and a minimum mean square error ($MSE_{min}$). The swapping technique selector comprises a performance improvement pre-calculator for determining a first index value (I) and a second index value (J) based on $MSE_{max}$, $MSE_{min}$, and said gain factor constraints according to a predetermined manner, a threshold comparator, connected to the performance improvement pre-calculator, for determining whether the larger one of I and J is larger than T, a performance improvement comparator, connected to the threshold comparator, for selectively determining whether I is equal to or larger than J, and a swapping technique selection device, connected to the performance improvement comparator, for selecting either the gain-swapping or the combination of gain-swapping and bit-swapping as the optimal swapping technique.

The method for performing gain-swapping performs gain swapping in a discrete multi-tone (DMT) system having multiple sub-channels, gain factor constraints, and a maximum mean square error ($MSE_{max}$) and a minimum mean square error ($MSE_{min}$). The gain factor constraints have a maximum gain factor constraint (Gcm) and a minimum gain factor constraint (Gcn). $g_{max}$ denotes the gain of the sub-channel respecting $MSE_{max}$ and $g_{min}$ denotes the gain of the channel respecting $MSE_{min}$. The method includes the step of obtaining a gain margin value Gmv by subtracting $g_{max}$ from Gcm, the step of obtaining another gain margin value Gmv' by subtracting Gcn from $g_{min}$, the step of obtaining a parameter (P) by subtracting $MSE_{min}$ from $MSE_{max}$, the step of obtaining the value MIN of the smallest one of the group consisting of Gmv, Gmv' and (0.5*P), and the step of adding gain in amount of MIN to the sub-channel having $MSE_{max}$ and subtracting gain in amount of MIN from the sub-channel having $MSE_{min}$. In this invention, a method and a swapping technique selector are proposed for an optimal swapping technique selection. Meanwhile, an algorithm for performing gain-swapping is also provided in the present invention. The method and apparatus can solve the problems of the gain factor constraints in all sub-channels, and minimize the difference between the maximum mean square error ($MSE_{max}$) and the minimum mean square error ($MSE_{min}$) for each swapping. By minimizing the difference between $MSE_{max}$ and $MSE_{min}$, one can optimize the system performance, and achieve optimal bandwidth utilization.

These and other objectives and advantages of the present invention will become apparent to those skilled in the art after comprehending the following detailed description of the preferred embodiment accompanied by several drawings.

BRIEF DESCRIPTION OF THE DRAWINGS

FIG. 10 is a table showing gain changes due to bit reduction over the sub-channel;

FIG. 11 is another schematic diagram showing the error levels of $MSE_{max}$ and $MSE_{min}$ an example after bit-swapping is performed;

DETAILED DESCRIPTION OF THE PREFERRED EMBODIMENTS

Figure 1:
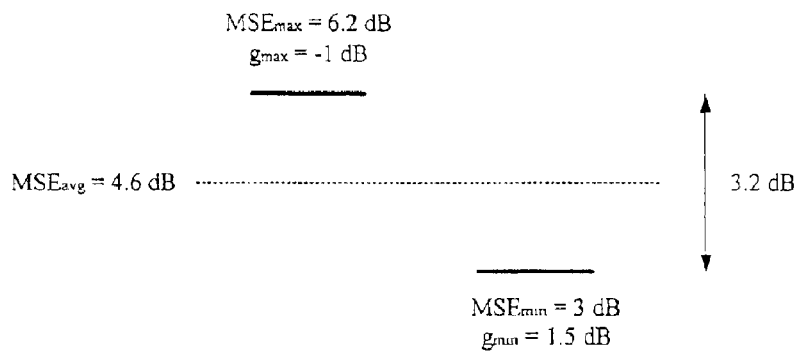
FIG. 1 is a schematic diagram showing an error level between $MSE_{max}$ and $MSE_{min}$ in a specific example.
Figure 2:
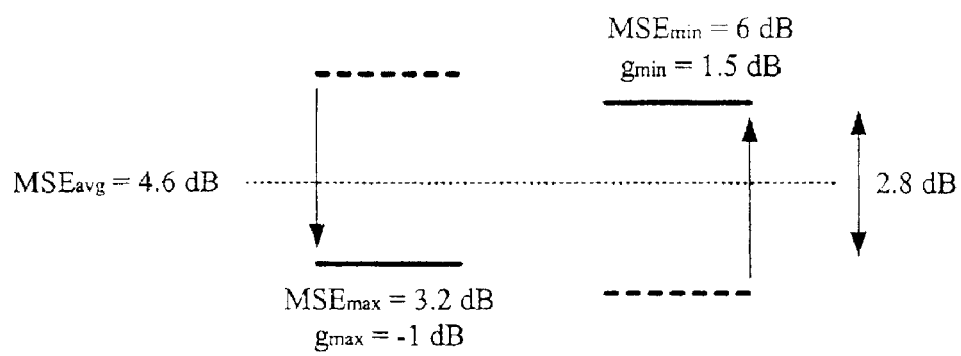
FIG. 2 is a schematic diagram showing an error level between $MSE_{max}$ and $MSE_{min}$ after the bit-swapping technique has been performed to the specific example shown in FIG. 1.
Figure 3:
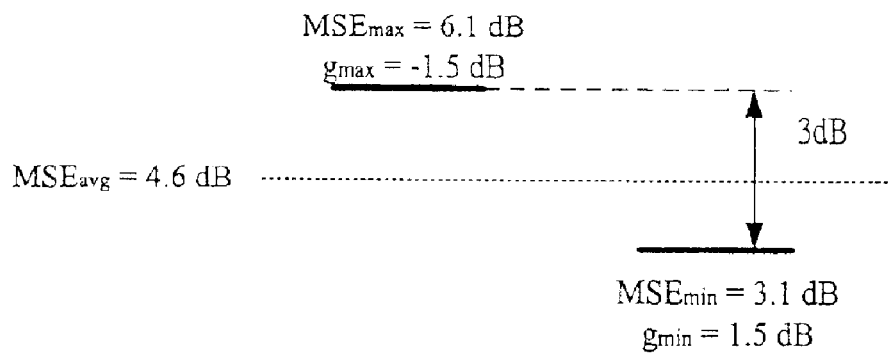
FIG. 3 is a schematic diagram showing an error level between $MSE_{max}$ and $MSE_{min}$ in a special case where the bit-swapping technique has no use at all.
Figure 4:
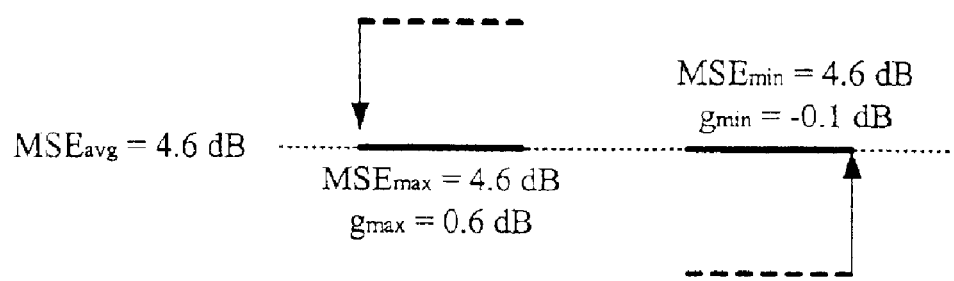
FIG. 4 is a schematic diagram showing an error level between $MSE_{max}$ and $MSE_{min}$ after a gain-swapping technique according to the present invention is performed in the specific example as shown in FIG. 1.

The present invention provides a method and a swapping technique selector for an optimal swapping technique selection. A method an a cooperating algorithm for performing gain-swapping are also provided in the present invention. According to the present invention, gain swapping either adds gains to or subtracts gains from the sub-channels respecting $MSE_{max}$ and $MSE_{min}$ according to a gain table. Addition of gains to the sub-channel respecting $MSE_{max}$ reduces the MSE. Subtraction of gains from the sub-channel respecting $MSE_{min}$ raises the MSE. Considering the same example shown in FIG. 1 in which a 1.6 dB gain is added to $g_{max}$ and is subtracted from $g_{min}$, the resultant error level diagram is shown in FIG. 4. Both the resultant $MSE_{max}$ and $MSE_{min}$ are 4.6 dB and the difference thereof is zero after the gain-swapping is employed. It is observed from FIGS. 2 and 4 that gain-swapping provides better performance than bit-swapping does.

Figure 5:
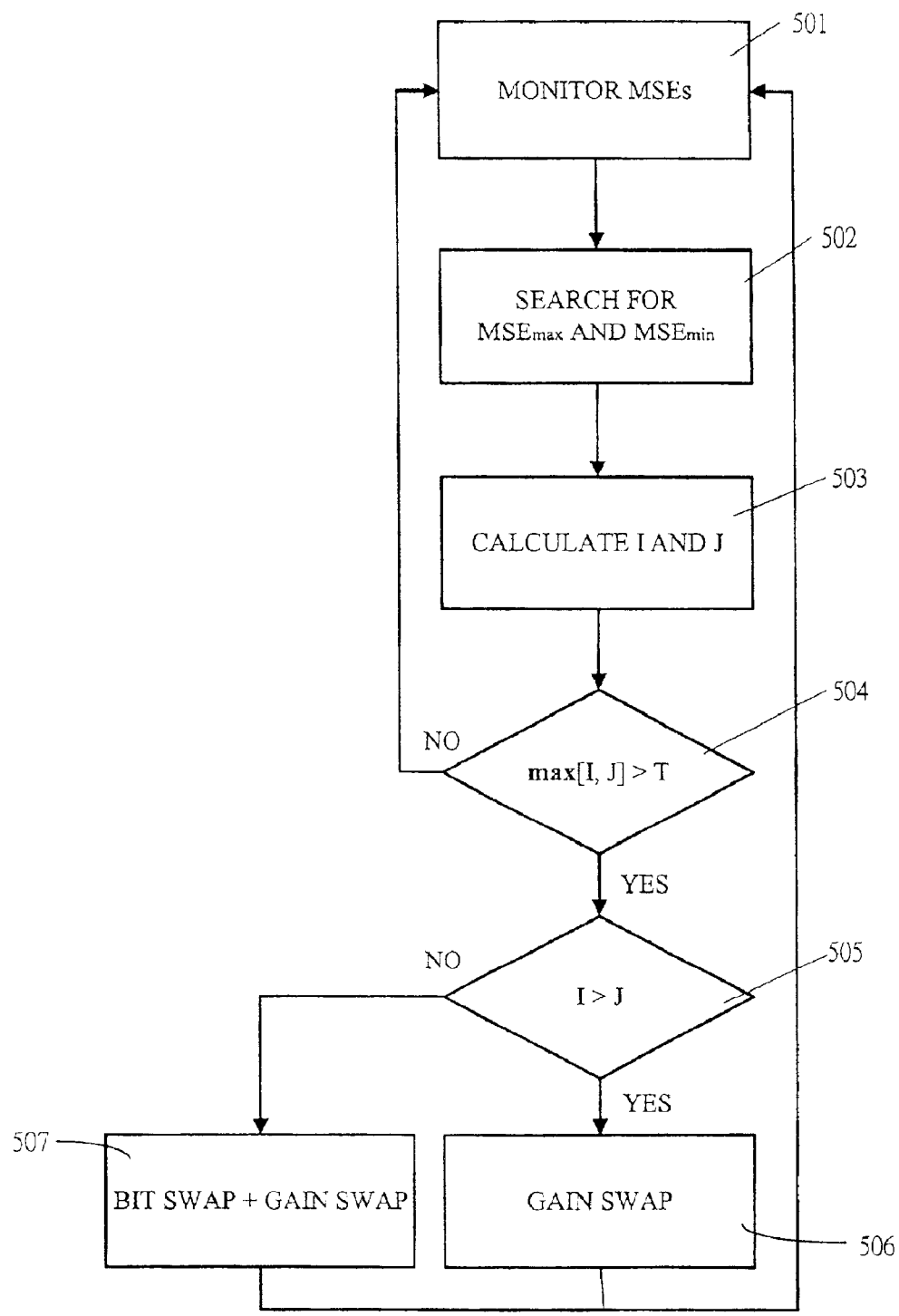
FIG. 5 is a flow diagram showing the method for selecting a swapping technique according to the preferred embodiment of the present invention.

In light of the advantages of gain-swapping described in the present invention over bit-swapping, the selection of an optimal swapping technique will be within the group consisting of gain-swapping and a combination of bit-swapping and gain-swapping. Bit-swapping is not in solo operation but is playing a supporting role so as to optimize the performance of gain swapping under the gain factor constraints. The algorithm will be described in detail below:

Refer now to FIG. 5, FIG. 5 is a flow diagram showing the method for selecting a swapping technique according to the preferred embodiment of the present invention.

The step 501 performs the monitoring of MSEs for each sub-channels of the system. The step 502 performs the determination of $MSE_{max}$ and $MSE_{min}$ from results of step 501. Then, a first index value I and a second index value J are respectively calculated in step 503 in accordance with a predetermined manner which will be recited hereinafter in associated paragraphs. I indicates the range of improvement while the gain-swapping is employed and J indicates the range of improvement while adopting the gain-swapping technique following a bit-swapping technique. In step 504, the larger one of I and J is compared with a threshold value T to determine whether it is larger. The threshold value is so chosen that it is larger enough and, at the same time, does not substantially degrade system performance. If the comparison in step 504 is negative, the system performance is not substantially degraded and performing any swapping technique is unnecessary, then the step 501 is again performed to keep on monitoring the MSE in each sub-channel.

If the comparison result of step 504 is affirmative, then compare I with J to see which technique can obtain a better performance in step 505. If I is larger, then go to step 506 to select gain-swapping as the desired swapping technique. If J is larger, then go to step 507 to select the combination of bit-swapping and gain-swapping as the desired swapping technique.

The calculation of I and J is described below and a physical meaning corresponding to each operation will also be provided. Hereinafter, the maximum gain factor constraint and the minimum gain factor constraint are denoted as Gcm and Gcn respectively. For example, in ANSI T1.413 standard, Gcm is 2.48 dB and Gcn is −2.5 dB, and in G. DMT or G. Lite standards, Gcm is 2.48 dB and Gcn is −14.42 dB.

Figure 6:
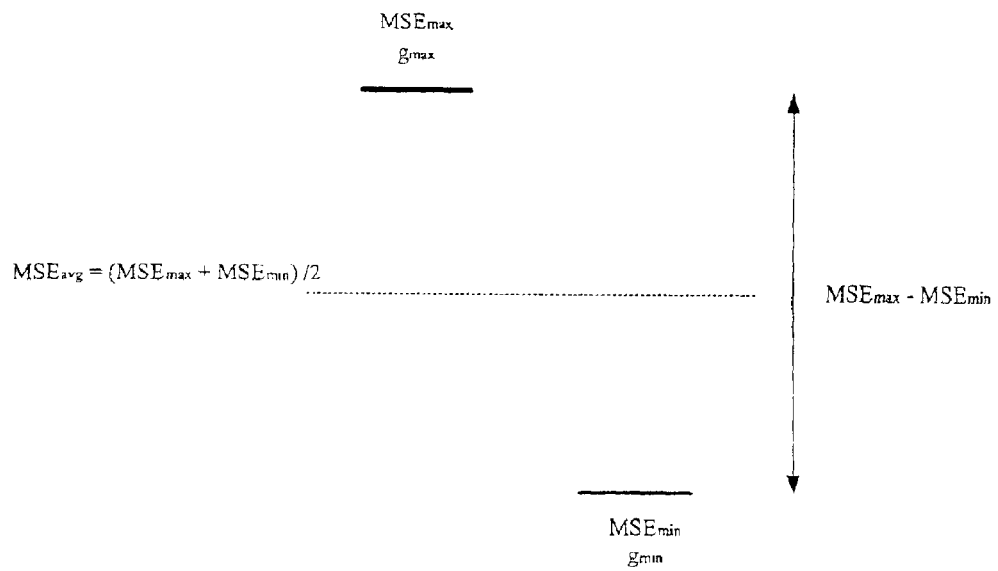
FIG. 6 is a schematic diagram showing error levels of $MSE_{max}$ and $MSE_{min}$ in an example, in which no gain-swapping has been performed yet.

Refer to an example FIG. 6, a first gain margin value, Gmv1, is obtained by subtracting gain ($g_{max}$) of the sub-channel respecting $MSE_{max}$ from Gcm (shown in Equation (1) below). Gmv1 stands for the amount of gain that can be added to $g_{max}$ under the gain factor constraints mentioned above to reduce the difference between $MSE_{max}$ and the average mean square error, $MSE_{avg}$. The $MSE_{avg}$ denotes an arithmetic average of $MSE_{max}$ and $MSE_{min}$.

$$Gmv1=Gcm-g_{max} \quad \text{Equation (1)}$$

In a similar way, a second gain margin value, Gmv2, is obtained by subtracting Gcn from $g_{min}$, which denotes the gain value of the channel respecting $MSE_{min}$. Gmv2 stands for the amount of gain that can be subtracted from $g_{min}$ under the gain factor constraints to reduce the difference between $MSE_{min}$ and $MSE_{avg}$.

$$Gmv2=g_{min}-Gcn \quad \text{Equation (2)}$$

To maintain the total gain of $MSE_{max}$ and $MSE_{min}$ unchanged after the gain-swapping operation, a first difference value D1 between $MSE_{max}$ and $MSE_{avg}$ after gain-swapping can be obtained following Equation (3) as follows:

$$D1=MSE_{max}-\min[(MSE_{max}-MSE_{min})/2, abs(Gmv1), abs(Gmv2)]-MSE_{avg} \quad \text{Equation (3)}$$

The min[x, y, z] denotes the minimum of x, y and z and abs(x) denotes the absolute value of x. If the value of $(MSE_{max}-MSE_{min})/2$, which equals $(MSE_{max}-MSE_{avg})$, is smaller than both abs(Gmv1) and abs(Gmv2), an amount of gain equal to $(MSE_{max}-MSE_{min})/2$ can be added to or subtracted from the sub-channels respecting $MSE_{max}$ and $MSE_{min}$. On the other hand, if both Gmv1 and Gmv2 are smaller than $(MSE_{max}-MSE_{min})/2$, only the smaller one of Gmv1 and Gmv2 can be added to the sub-channel respecting $MSE_{max}$ and subtracted from the sub-channel respecting $MSE_{min}$.

The minimum selected from the group consisting of $(MSE_{max}-MSE_{min})/2$, abs(Gmv1) and abs(Gmv2) represents the amount of gain added to or subtracted from the sub-channels corresponding to $MSE_{max}$ and $MSE_{min}$ respectively when one performs gain-swapping. It is the basic algorithm required when performing gain-swapping. Any additional element for further detailed adjustment can be apparent to persons in this art after they learn the basic algorithm provided above.

Similarly, to maintain the total gain of $MSE_{max}$ and $MSE_{min}$ unchanged after the gain-swapping operation, a second difference value D2 between $MSE_{avg}$ and $MSE_{min}$ after gain-swapping can be obtained according to Equation (4):

$$D2=MSE_{avg}-(MSE_{min}+\min[(MSE_{max}-MSE_{min})/2, abs(Gmv1), abs(Gmv2)]). \quad \text{Equation (4)}$$

Note that the values of D1 and D2 are the same.

Figure 7:
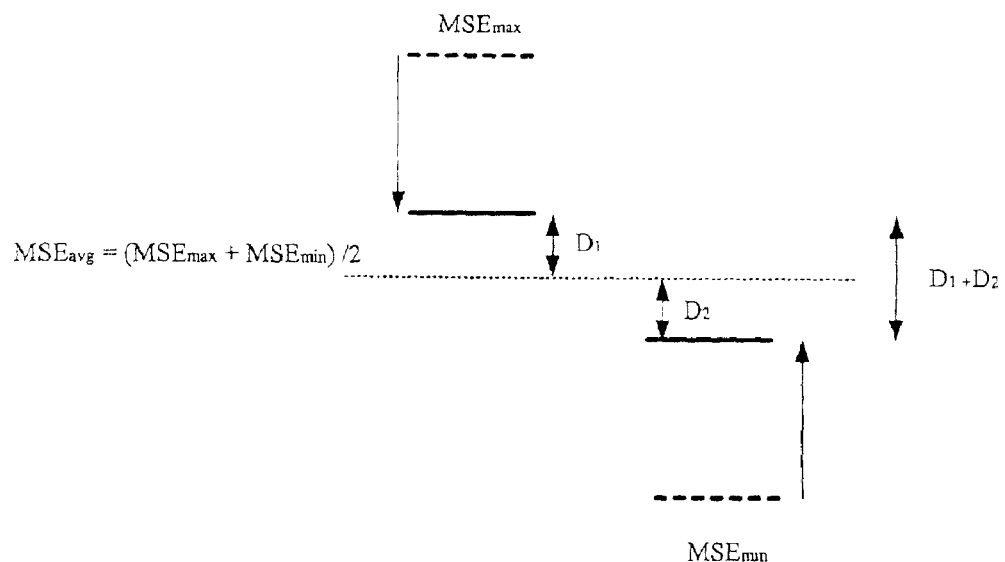
FIG. 7 is a schematic diagram showing the difference between the error levels of $MSE_{max}$ and $MSE_{avg}$ and error levels of $MSE_{min}$ and $MSE_{avg}$ after the gain-swapping technique has been performed over the example of FIG. 6.

Refer to FIG. 7 for showing the resultant error level diagram after the gain-swapping operation is performed. The first index value, I, indicating the range of improvement while the gain-swapping is employed, is shown in Equation (5).

$$I=MSE_{max}-MSE_{min}-(D1+D2) \quad \text{Equation (5)}$$

When replacing D1 and D2 with expressions in equation (3) and (4) into (5), I Will be:

$$I=2\min[(MSE_{max}-MSE_{min})/2, abs(Gmv1), abs(Gmv2)] \quad \text{Equation (6)}$$

Considering now the second index value J regarding the range of improvement while adopting the gain-swapping after performing the bit-swapping. For the sub-channel respecting $MSE_{max}$, one bit is removed from it when performing the bit-swapping, and responsive to that removal, $MSE_{max}$ becomes $MSE_{maxbs}$, which denotes $MSE_{max}$ after bit-swapping is performed. For the sub-channel respecting $MSE_{min}$, one bit is added to it when performing the bit-swapping, and responsive to that addition, $MSE_{min}$ becomes $MSE_{minbs}$ which denotes $MSE_{min}$ after the bit-swapping is performed. Although the error level of $MSE_{max}$ before performing bit-swapping is above the error level of $MSE_{avg}$, it is possible that $MSE_{maxbs}$ may drop under $MSE_{avgbs}$, which denotes the average mean square error of $MSE_{maxbs}$ and $MSE_{minbs}$. Consequently, we need to consider two possible cases.

Case 1: $MSE_{maxbs} < MSE_{avgbs}$

Figure 8:
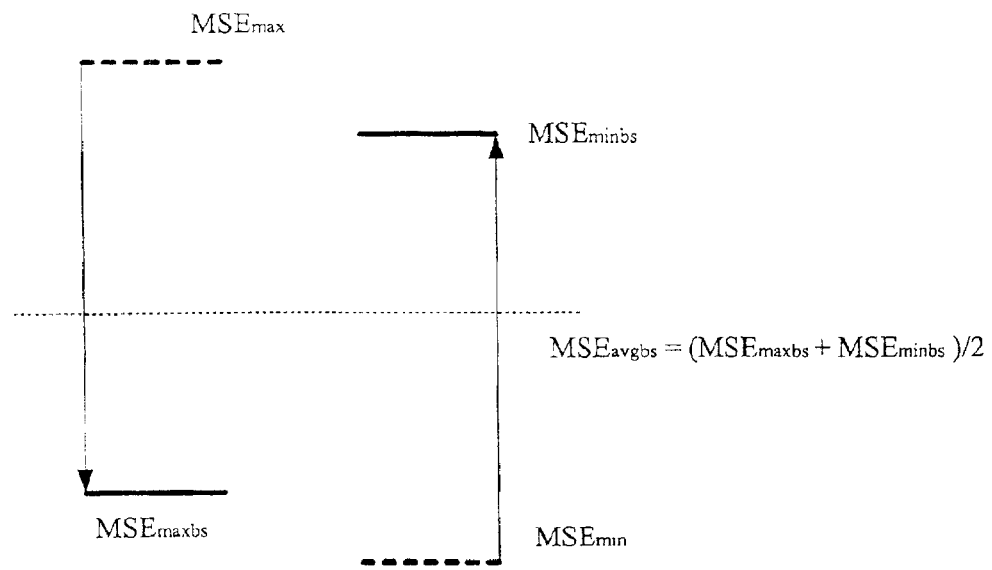
FIG. 8 is a schematic diagram showing the error levels of $MSE_{max}$ and $MSE_{min}$ after a bit-swapping has been performed over the example shown in FIG. 6.

As shown in FIG. 8, it indicates an error level diagram after a bit-swapping operation is performed. And, in this example, $MSE_{minbs}$ goes above $MSE_{avgbs}$ while $MSE_{maxbs}$ goes below $MSE_{avgbs}$. Following the same reasoning recited in the calculation of I, a third gain margin value, Gmv3, is obtained by subtracting Gcn from $g_{max}$ and a fourth gain margin value, Gmv4, is obtained by subtracting $g_{min}$ from Gcm.

$$Gmv3=g_{max}-Gcn \quad \text{Equation (7)}$$

$$Gmv4=Gcm-g_{min} \quad \text{Equation (8)}$$

Figure 9:
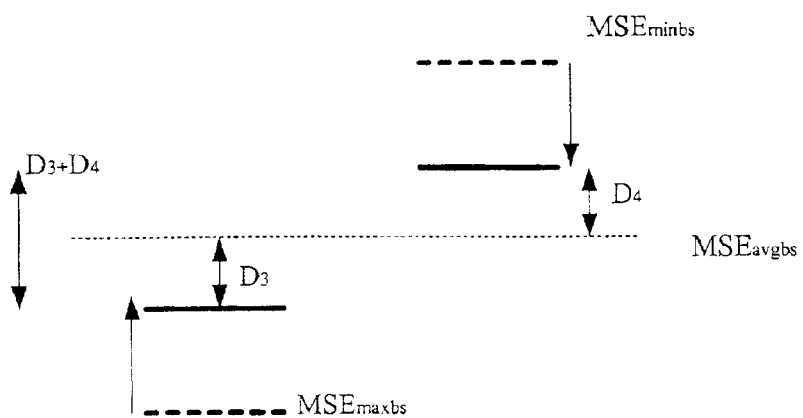
FIG. 9 is a schematic diagram showing the error levels of $MSE_{max}$ and $MSE_{min}$ after the gain-swapping technique according to the present invention has been performed in the example shown in FIG. 8.

The resultant error level diagram by a gain-swapping over the example shown in FIG. 8 is shown in FIG. 9. To maintain the total gain of $MSE_{maxbs}$ and $MSE_{minbs}$ unchanged after the gain-swapping operation, a third difference value D3 between $MSE_{maxbs}$ and $MSE_{avgbs}$ after performing a combination of bit-swapping and gain-swapping can be obtained from Equation (9).

$$D3=MSE_{avgbs}-(MSE_{maxbs}+\min[(MSE_{minbs}-MSE_{maxbs})/2, abs(Gmv3), abs(Gmv4)]) \quad \text{Equation (9)}$$

The min[x, y, z] denotes the minimum of x, y and z and abs(x) denotes the absolute value of x. If the value of ($MSE_{minbs}$−$MSE_{maxbs}$)/2 is smaller than both abs (Gmv3) and abs(Gmv4), an amount of gain equal to ($MSE_{minbs}$−$MSE_{maxbs}$)/2 can be added to or subtracted from the sub-channels respecting $MSE_{max}$ and $MSE_{min}$ respectively. On the other hand, if both Gmv3 and Gmv4 are smaller than ($MSE_{minbs}$−$MSE_{maxbs}$)/2, only the smaller one of Gmv3 and Gmv4 is added to the sub-channel respecting $MSE_{max}$ and subtracted from the sub-channel respecting $MSE_{min}$.

Similarly, to maintain the total gain of $MSE_{maxbs}$ and $MSE_{minbs}$ unchanged after the gain-swapping operation, a fourth difference value, D4, between $MSE_{avgbs}$ and $MSE_{minbs}$ after performing a combination of bit-swapping and gain-swapping can be obtained from Equation (10).

$$D4=MSE_{minbs}-\min[(MSE_{minbs}-MSE_{maxbs})/2,abs(Gmv3),abs(Gmv4)]-MSE_{avgbs} \quad \text{Equation (10)}$$

The amount of change in gain due to reducing or increasing one bit from the sub-channel respecting $MSE_{max}$ and the sub-channel respecting $MSE_{min}$ is not always the same through different loading of data bit. FIG. 10 is a table showing gain changes ($G_{bi} \to G_{bi-1}$) due to bit reduction (bi→bi-1) from i to i-1. For simplicity, $G_{bi} \to G_{bi-1}$ can be estimated by 3 dB.

Note that D3 and D4 are equal in magnitude. The second index value J, which indicates the range of improvement while a combination of bit-swapping and gain-swapping is employed, can be obtained from Equation (11).

$$J=MSE_{max}-MSE_{min}-(D3+D4) \quad \text{Equation (11)}$$

Case 2: $MSE_{max}bs > MSE_{avgbs}$

As shown in FIG. 11 which indicates an error level diagram after a bit-swapping operation is performed. And, in this example, $MSE_{minbs}$ is under $MSE_{avgbs}$ while $MSE_{maxbs}$ is above $MSE_{avgbs}$. Following the same reasoning recited in the calculation of I, a fifth gain margin value, Gmv5, is obtained by subtracting $g_{max}$ from Gcm and a sixth gain margin value, Gmv6, is obtained by subtracting Gcn from $g_{min}$.

$$Gmv5=Gcm-g_{max} \quad \text{Equation (12)}$$

$$Gmv6=g_{min}-Gcn \quad \text{Equation (13)}$$

Figure 12:
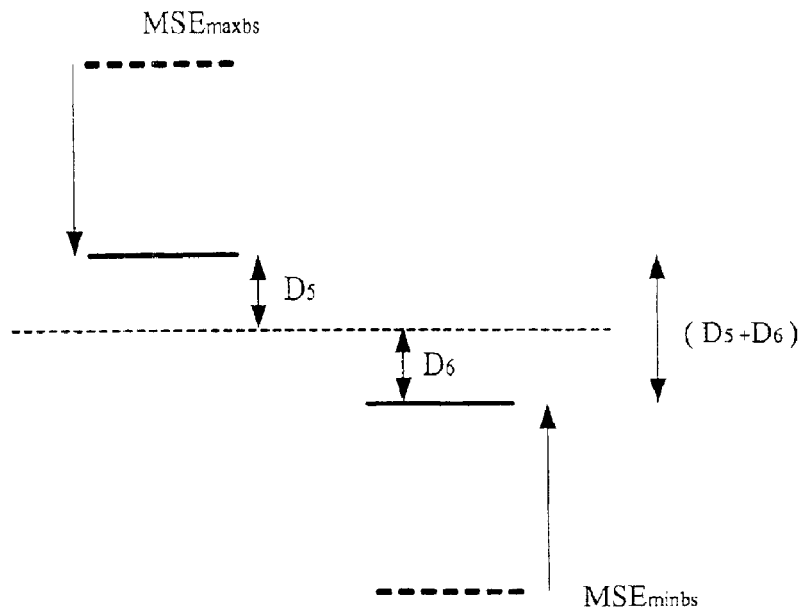
FIG. 12 is a schematic diagram showing the resulted error levels of $MSE_{max}$ and $MSE_{min}$ after gain-swapping is performed over the example shown in FIG. 11.

The resultant error level diagram by a gain-swapping over the example shown in FIG. 11 is shown in FIG. 12. To maintain the total gain of $MSE_{maxbs}$ and $MSE_{minbs}$ unchanged after the gain-swapping operation, a fifth difference value D5 between $MSE_{maxbs}$ and $MSE_{avgbs}$ after a combination of bit-swapping and gain-swapping can be obtained from Equation (14).

$$D5=MSE_{maxbs}-\min[(MSE_{maxbs}-MSE_{minbs})/2,abs(Gmv5),abs(Gmv6)]-MSE_{avgbs} \quad \text{Equation (14)}$$

The min[x, y, z] denotes the minimum of x, y and z and abs(x) denotes the absolute value of x. If the value of ($MSE_{maxbs}$−$MSE_{minbs}$)/2 is smaller than both abs (Gmv5) and abs(Gmv6), an amount of gain equal to ($MSE_{maxbs}$−$MSE_{minbs}$)/2 can be added to or subtracted from the sub-channels respecting $MSE_{max}$ and $MSE_{min}$ respectively. On the other hand, if both Gmv5 and Gmv6 are smaller than ($MSE_{maxbs}$−$MSE_{minbs}$)/2, only the smaller one of Gmv5 and Gmv6 is added to the sub-channel respecting $MSE_{max}$ and subtracted from the sub-channel respecting $MSE_{min}$.

Similarly, to maintain the total gain of $MSE_{maxbs}$ and $MSE_{minbs}$ unchanged after the gain-swapping operation, a sixth difference value D6 between $MSE_{avgbs}$ and $MSE_{minbs}$ after performing a combination of bit-swapping and gain-swapping can be obtained from Equation (15).

$$D6=MSE_{avgbs}-(MSE_{minbs}+\min[(MSE_{maxbs}-MSE_{minbs})/2,abs(Gmv5),abs(Gmv6)]) \quad \text{Equation (15)}$$

Note that D5 and D6 are equal in magnitude. The second index value J, which indicates the range of improvement while adopting a combination of bit-swapping and gain-swapping, can be obtained from Equation (16).

$$J=MSE_{max}-MSE_{min}-(D5+D6) \quad \text{Equation (16)}$$

Figure 13:
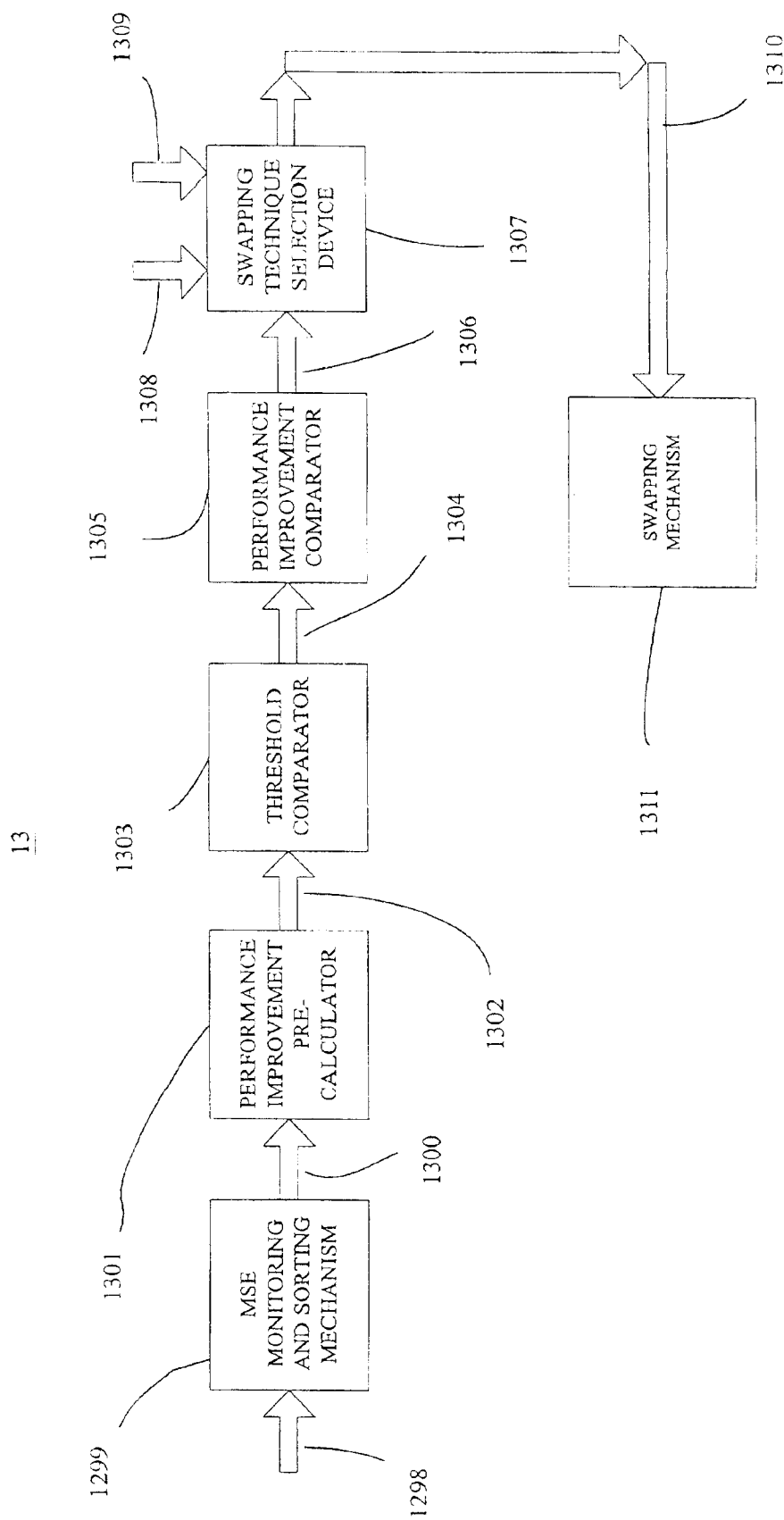
FIG. 13 is a block diagram showing a swapping technique selector according to the preferred embodiment of the present invention.

The method recited above may be implemented by a swapping technique selector provided by the present invention. Referring now to FIG. 13, the swapping technique selector 13 of the invention includes a MSE monitoring and sorting device 1299, a performance improvement pre-calculator 1301, a threshold comparator 1303, a performance improvement comparator 1305, a swapping technique selection device 1307, and a swapping mechanism 1311.

The MSE monitoring and sorting device 1299 detects the noise in each sub-channel 1298, calculates the MSE in each sub-channel and sorts these MSEs by magnitude. The performance improvement pre-calculator 1301 receives data 1300 from the MSE monitoring and sorting mechanism 1299. The MSE monitoring and sorting device 1299 was disclosed in U.S. Pat. No. 5,479,447 and can be achieved by persons in the art. The data 1300, which is the output of the step 502 shown in FIG. 5, includes information of $MSE_{max}$, $g_{max}$, $MSE_{min}$ and $g_{min}$. With these pieces of information, the performance improvement pre-calculator 1301 performs the step 503 shown in FIG. 5 to obtain the I, J index values on signal line 1302.

The threshold comparator 1303 receives the I, J index values from signal line 1302 and performs the step 504 shown in FIG. 5 to compare the largest one of the index values with the threshold value T mentioned above. When the condition meets, the threshold comparator 1303, via the signal 1304, then sends the I, J index values to the performance improvement comparator 1305 and command the performance improvement comparator 1305 to perform step 505 shown in FIG. 5.

The swapping technique selection device 1307 receives a gain swapping request 1308 and a request for bit swapping and gain swapping 1309. Depending on the result on signal line 1306, the swapping technique selection device 1307 selects a swapping request from 1308 and 1309 and sends the selected swapping request 1310 to a swapping mechanism 1311. The swapping technique selection device 1307 selects the gain swapping request as in step 506, or selects a request for a combination of bit-swapping and gain swapping as in step 507 shown in FIG. 5. In the preferred embodiment, if I is larger than or equal to J, gain-swapping is selected and if I is smaller than J, a combination of gain-swapping and bit-swapping is selected.

Figure 14:
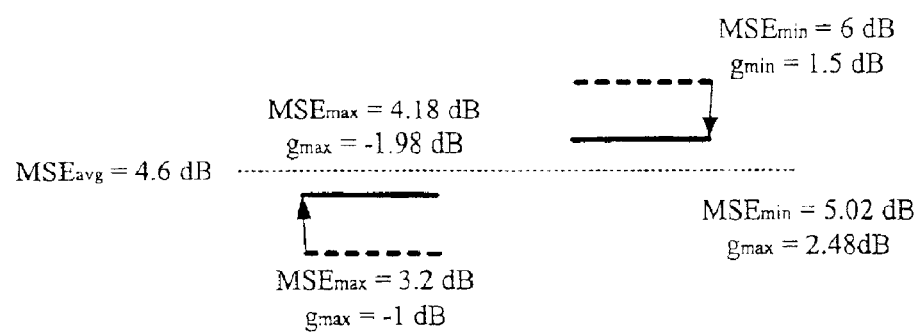
FIG. 14 is a schematic diagram showing the error levels of $MSE_{max}$ and $MSE_{min}$ after a gain-swapping technique is performed over an example shown in FIG. 2 in accordance with the present invention.

To illustrate the selection between gain-swapping and bit-swapping, an example is given below. When performing gain-swapping to the system presented in FIG. 2, the resultant error level diagram is shown in FIG. 14. The $MSE_{max}$ and $MSE_{min}$ are 4.18 dB and 5.02 dB respectively when ANSI T1.413 standard is applied here. The difference between $MSE_{max}$ and $MSE_{min}$ is now 0.84 dB, which is larger than the 0 dB when only gain-swapping is performed. The second index value J is 2.36 dB while the first index value I is 3.2 dB. Therefore, gain-swapping is then selected as the optimal swapping technique.

Note that the threshold value T is fixed or dynamically generated. Preferably T is approximately 1 dB in most of the cases.

In this invention, a method and a swapping technique selector are proposed for an optimal swapping technique selection. Meanwhile, an algorithm for performing gain-swapping is also provided in the present invention. The method and apparatus can solve the problems of the gain factor constraints in all sub-channels, and minimize the difference between the maximum mean square error ($MSE_{max}$) and the minimum mean square error ($MSE_{min}$) for each swapping. By minimizing the difference between $MSE_{max}$ and $MSE_{min}$, one can optimize the system performance, and achieve optimal bandwidth utilization.

What is claimed is:

1. A method for selecting a swapping technique from a group consisting of a bit-swapping and a gain-swapping techniques in a discrete multi-tone (DMT) system having multiple sub-channels, gain factor constraints, a threshold index value (T), and a maximum mean square error ($MSE_{max}$) and a minimum mean square error ($MSE_{min}$), the method comprising:

determining a first index value (I) and a second index value (J) based on $MSE_{max}$, $MSE_{min}$ and said gain factor constraints according to a predetermined manner, I denoting range of improvement when adopting the gain-swapping as the swapping technique, and J denoting range of improvement when adopting a combination of the gain-swapping and the bit-swapping as the swapping technique; determine whether larger one of I and J is larger than T;

if the larger one of I and J is larger than T, determining whether I is equal to or larger than J; and selecting the gain-swapping as the swapping technique if I is equal to or larger than J.

2. The method as recited in claim 1, further comprising a step of selecting a combination of gain-swapping and bit-swapping as the swapping technique if I is smaller than J.

3. The method as recited in claim 1, wherein the gain factor constraints have a maximum gain factor constraint (Gcm) and a minimum gain factor constraint (Gcn), $g_{max}$ denotes the gain of the sub-channel respecting $MSE_{max}$, $g_{min}$ denotes the gain of the sub-channel respecting $MSE_{min}$, said predetermined manner comprises the steps of:

obtaining a gain margin value (Gmv) by subtracting $g_{max}$ from Gcm, and obtaining another gain margin value (Gmv') by subtracting Gcn from $g_{min}$;

obtaining a parameter (P) by subtracting $MSE_{min}$ from $MSE_{max}$; and obtaining the I by doubling a smallest one of the group consisting of Gmv, Gmv' and (0.5*P).

4. The method as recited in claim 1, wherein the gain factor constraints have a maximum gain factor constraint (Gcm) and a minimum gain factor constraint (Gcn), $g_{max}$ denotes the gain of the sub-channel respecting $MSE_{max}$, $g_{min}$ denotes the gain of the sub-channel respecting $MSE_{min}$, $MSE_{avgbs}$ denotes an arithmetic average of $MSE_{max}$ and $MSE_{min}$ after bit-swapping and $MSE_{maxbs}$ denotes $MSE_{max}$ after bit-swapping and $MSE_{minbs}$ denotes $MSE_{min}$ after bit-swapping, and as $MSE_{maxbs}$ is smaller than $MSE_{avgbs}$, the predetermined manner comprises the steps of:

obtaining a gain margin value ($Gmv_b$) by subtracting Gcn from $g_{max}$, and obtaining another gain margin value ($Gmv'_b$) by subtracting $g_{min}$ from Gcm;

obtaining a parameter (P) by subtracting $MSE_{maxbs}$ from $MSE_{minbs}$;

obtaining another parameter (P') by subtracting $MSE_{maxbs}$ and a smallest one of the group, consisting of $Gmv_b$, $Gmv'_b$ and (0.5*P), from $MSE_{avgbs}$; and obtaining the J by subtracting $MSE_{min}$ and (2*P') from $MSE_{max}$.

5. The method as recited in claim 1, wherein the gain factor constraints have a maximum gain factor constraint (Gcm) and a minimum gain factor constraint (Gcn), $g_{max}$ denotes the gain of the sub-channel respecting $MSE_{max}$, $g_{min}$ denotes the gain of the sub-channel respecting $MSE_{min}$, $MSE_{avgbs}$ denoted the arithmetic average of $MSE_{max}$ and $MSE_{min}$ after bit-swapping and $MSE_{maxbs}$ denotes $MSE_{max}$ after bit-swapping and $MSE_{minbs}$ denotes $MSE_{min}$ after bit-swapping, and as $MSE_{maxbs}$ is not smaller than $MSE_{avgbs}$, the predetermined manner comprises the steps of:

obtaining a gain margin value (Gmv) by subtracting $g_{max}$ from Gcm, and obtaining another gain margin value (Gmv') by subtracting Gcn from $g_{min}$;

obtaining a parameter (P) by subtracting $MSE_{minbs}$ from $MSE_{maxbs}$;

obtaining another parameter (P') by subtracting $MSE_{avgbs}$ and a smallest one of the group, consisting of Gmv, Gmv' and (0.5*P), from $MSE_{maxbs}$; and obtaining the J by subtracting $MSE_{min}$ and (2*P') from $MSE_{max}$.

6. The method as recited in claim 1, wherein the gain factor constraints have a maximum gain factor constraint (Gcm) and a minimum gain factor constraint (Gcn), $g_{max}$ denotes the gain of the sub-channel respecting $MSE_{max}$, $g_{min}$ denotes the gain of the sub-channel respecting $MSE_{min}$, $MSE_{avgbs}$ denotes the arithmetic average of $MSE_{max}$ and $MSE_{min}$ after bit-swapping, $MSE_{maxbs}$ denotes $MSE_{max}$ after bit-swapping, $MSE_{minbs}$ denotes $MSE_{min}$ after bit-swapping, and as $MSE_{maxbs}$ is smaller than $MSE_{avgbs}$, the predetermined manner comprises the steps of:

obtaining a gain margin value ($Gmv_b$) by subtracting Gcn from $g_{max}$, and obtaining a another gain margin value ($Gmv'_b$) by subtracting $g_{min}$ from Gcm;

obtaining a parameter (P) by subtracting $MSE_{maxbs}$ from $MSE_{minbs}$;

obtaining another parameter (P') by subtracting a smallest one of the group, consisting of $Gmv_b$, $Gmv_b$ and (0.5*P), and $MSE_{avgbs}$ from $MSE_{minbs}$; and obtaining the J by subtracting $MSE_{min}$ and (2*P') from $MSE_{max}$.

7. The method as recited in claim 1, wherein the gain factor constraints have a maximum gain factor constraint (Gcm) and a minimum gain factor constraint (Gcn), $g_{max}$ denotes the gain of the sub-channel respecting $MSE_{max}$, $g_{min}$ denotes the gain of the channel respecting $MSE_{min}$, $MSE_{avgbs}$ denotes the arithmetic average of $MSE_{max}$ and $MSE_{min}$ after bit-swapping, $MSE_{maxbs}$ denotes $MSE_{max}$ after bit-swapping, $MSE_{minbs}$ denotes $MSE_{min}$ after bit-swapping, and as $MSE_{maxbs}$ is not smaller than $MSE_{avgbs}$, the predetermined manner comprises the steps of:

obtaining a gain margin value (Gmv) by subtracting $g_{max}$ from Gcm, and obtaining another gain margin value (Gmv') by subtracting Gcn from $g_{min}$;

obtaining a parameter (P) by subtracting $MSE_{minbs}$ from $MSE_{maxbs}$;

obtaining another parameter (P') by subtracting $MSE_{minbs}$ and a smallest one of the group, consisting of Gmv, Gmv'and (0.5*P), from $MSE_{avgbs}$; and obtaining the J by subtracting $MSE_{min}$ and (2*P') from $MSE_{max}$.

8. A method for performing gain-swapping in a discrete multi-tone (DMT) system having multiple sub-channels, gain factor constraints, and a maximum mean square error ($MSE_{max}$) and a minimum mean square error ($MSE_{min}$), wherein the gain factor constraints have a maximum gain factor constraint (Gcm) and a minimum gain factor constraint (Gcn), $g_{max}$ denotes the gain of the sub-channel respecting $MSE_{max}$, $g_{min}$ denotes the gain of the channel respecting $MSE_{min}$, said method comprising the steps of:

obtaining gain margin value (Gmv) by subtracting $g_{max}$ from Gcm, and obtaining another gain margin value (Gmv') by subtracting Gcn from $g_{min}$;

obtaining a parameter (P) by subtracting $MSE_{min}$ from $MSE_{max}$;

obtaining the value MIN of the smallest one of the group consisting of Gmv, Gmv' and (0.5*P); and adding gain in amount of MIN to the sub-channel having $MSE_{max}$ and subtracting gain in amount of MIN from the sub-channel having $MSE_{min}$.

9. A swapping technique selector for selecting an optimal swapping technique from a group consisting of a bit-swapping and a gain-swapping techniques in a discrete multi-tone (DMT) system having multiple sub-channels, gain factor constraints, and a threshold index value (T) and a maximum mean square error ($MSE_{max}$) and a minimum mean square error ($MSE_{min}$), the swapping technique selector comprising:

a performance improvement pre-calculator for determining a first index value (I) and a second index value (J) based on $MSE_{max}$, $MSE_{min}$ and said gain factor constraints according to a predetermined manner, I denoting range of improvement when adopting the gain-swapping as the optimal swapping technique, and J denoting range of improvement when adopting a combination of the gain-swapping and the bit-swapping as the optimal swapping technique;

a threshold comparator, connected to the performance improvement pre-calculator, for determining whether the larger one of I and J is larger than T;

a performance improvement comparator, connected to the threshold comparator, for selectively determining whether I is equal to or larger than J; and a swapping technique selection device, connected to the performance improvement comparator, for selecting either the gain-swapping or the combination of gain-swapping and bit-swapping as the optimal swapping technique.

10. The selector of claim 9, wherein the gain factor constraints have a maximum gain factor constraint (Gcm) and a minimum gain factor constraint (Gcn), $g_{max}$ denotes the gain of the sub-channel respecting $MSE_{max}$, $g_{min}$ denotes the gain of the sub-channel respecting $MSE_{min}$, said predetermined manner comprises the steps of:

obtaining a gain margin value (Gmv) by subtracting $g_{max}$ from Gcm, and obtaining another gain margin value (Gmv') by subtracting Gcn from $g_{min}$;

obtaining a parameter (P) by subtracting $MSE_{min}$ from $MSE_{max}$; and obtaining the I by doubling a smallest one of the group consisting of Gmv, Gmv' and (0.5*P).

11. The selector of claim 9, wherein the gain factor constraints have a maximum gain factor constraint (Gcm) and a minimum gain factor constraint (Gcn), $g_{max}$ denotes the gain of the sub-channel respecting $MSE_{max}$, $g_{min}$ denotes the gain of the sub-channel respecting $MSE_{min}$, $MSE_{avgbs}$ denotes an arithmetic average of $MSE_{max}$ and $MSE_{min}$ after bit-swapping and $MSE_{maxbs}$ denotes $MSE_{max}$ after bit-swapping, and as $MSE_{maxbs}$ is smaller than $MSE_{avgbs}$, the predetermined manner comprises the steps of:

obtaining a gain margin value ($Gmv_b$) by subtracting Gcn from $g_{max}$, and obtaining another gain margin value ($Gmv'_b$) by subtracting $g_{min}$ from Gcm;

obtaining a parameter (P) by subtracting $MSE_{maxbs}$ from $MSE_{minbs}$;

obtaining another parameter (P') by subtracting $MSE_{maxbs}$ and a smallest one of the group, consisting of $Gmv_b$, $Gmv'_b$ and (0.5*P), from $MSE_{avgbs}$; and obtaining the J by subtracting $MSE_{min}$ and (2*P') from $MSE_{max}$.

12. The selector of claim 9, wherein the gain factor constraints have a maximum gain factor constraint (Gcm) and a minimum gain factor constraint (Gcn), $g_{max}$ denotes the gain of the sub-channel respecting $MSE_{max}$, $g_{min}$ denotes the gain of the sub-channel respecting $MSE_{min}$, $MSE_{avgbs}$ denoted the arithmetic average of $MSE_{max}$ and $MSE_{min}$ after bit-swapping and $MSE_{maxbs}$ denotes $MSE_{max}$ after bit-swapping and $MSE_{minbs}$ denotes $MSE_{min}$ after bit-swapping, and as $MSE_{maxbs}$ is not smaller than $MSE_{avgbs}$, the predetermined manner comprises the steps of:

obtaining a gain margin value (Gmv) by subtracting $g_{max}$ from Gcm, and obtaining another gain margin value (Gmv') by subtracting Gcn from $g_{min}$;

obtaining a parameter (P) by subtracting $MSE_{minbs}$ from $MSE_{maxbs}$;

obtaining a another parameter (P') by subtracting $MSE_{avgbs}$ and a smallest one of the group, consisting of Gmv, Gmv' and (0.5*P), from $MSE_{maxbs}$; and obtaining the J by subtracting $MSE_{min}$ and (2*P') from $MSE_{max}$.

13. The selector of claim 9, wherein the gain factor constraints have a maximum gain factor constraint (Gcm) and a minimum gain factor constraint (Gcn), $g_{max}$ denotes the gain of the sub-channel respecting $MSE_{max}$, $g_{min}$ denotes the gain of the sub-channel respecting $MSE_{min}$, $MSE_{avgbs}$ denotes the arithmetic average of $MSE_{max}$ and $MSE_{min}$ after bit-swapping, $MSE_{maxbs}$ denotes $MSE_{max}$ after bit-swapping, $MSE_{minbs}$ denotes $MSE_{min}$ after bit-swapping, and as $MSE_{maxbs}$ is smaller than $MSE_{avgbs}$, the predetermined manner comprises the steps of:

obtaining a gain margin value ($Gmv_b$) by subtracting Gcn from $g_{max}$, and obtaining another gain margin value ($Gmv'_b$) by subtracting $g_{min}$ from Gcm;

obtaining a parameter (P) by subtracting $MSE_{maxbs}$ from $MSE_{minbs}$;

obtaining another parameter (P') by subtracting a smallest one of the group consisting of $Gmv_b$, $Gmv'_b$ and (0.5*P) and $MSE_{avgbs}$ from $MSE_{minbs}$; and obtaining the J by subtracting $MSE_{min}$ and (2*P') from $MSE_{max}$.

14. The selector of claim 9, wherein the gain factor constraints have a maximum gain factor constraint (Gcm) and a minimum gain factor constraint (Gcn), $g_{max}$ denotes the gain of the sub-channel respecting $MSE_{max}$, $g_{min}$ denotes the gain of the channel respecting $MSE_{min}$, $MSE_{avgbs}$ denotes the arithmetic average of $MSE_{max}$ and $MSE_{min}$ after bit-swapping, $MSE_{maxbs}$ denotes $MSE_{max}$ after bit-swapping, $MSE_{minbs}$ denotes $MSE_{min}$ after bit-swapping, and as $MSE_{maxbs}$ is not smaller than $MSE_{avgbs}$, the predetermined manner comprises the steps of:

obtaining a gain margin value (Gmv) by subtracting $g_{max}$ from Gcm, and obtaining another gain margin value (Gmv') by subtracting Gcn from $g_{min}$;

obtaining a parameter (P) by subtracting $MSE_{minbs}$ from $MSE_{maxbs}$;

obtaining another parameter (P') by subtracting $MSE_{minbs}$ and a smallest one of the group consisting of Gmv, Gmv' and (0.5*P) from $MSE_{avgbs}$; and obtaining the J by subtracting $MSE_{min}$ and (2*P') from $MSE_{max}$.

* * * * *